(12) United States Patent
Wong et al.

(10) Patent No.: US 9,104,410 B2
(45) Date of Patent: Aug. 11, 2015

(54) POWER SAVING HARDWARE

(75) Inventors: Kin-Yee Wong, Ottawa (CA); Joseph Rorai, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1050 days.

(21) Appl. No.: 12/984,060

(22) Filed: Jan. 4, 2011

(65) Prior Publication Data

US 2012/0173889 A1 Jul. 5, 2012

(51) Int. Cl.
*H04L 12/56* (2006.01)
*G06F 1/32* (2006.01)
*H04L 12/931* (2013.01)
*G06F 13/38* (2006.01)
*H04L 12/933* (2013.01)

(52) U.S. Cl.
CPC ............ *G06F 1/3203* (2013.01); *G06F 13/387* (2013.01); *H04L 49/10* (2013.01); *H04L 49/70* (2013.01)

(58) Field of Classification Search
CPC ..... G06F 1/3203; G06F 13/387; H04L 49/10; H04L 49/70
See application file for complete search history.

(56) References Cited

U.S. PATENT DOCUMENTS

| | | | |
|---|---|---|---|
| 8,706,172 B2 * | 4/2014 | Priyantha et al. ............ | 455/574 |
| 2005/0086393 A1 * | 4/2005 | Meng et al. ....................... | 710/1 |
| 2008/0117909 A1 * | 5/2008 | Johnson ......................... | 370/392 |
| 2009/0105602 A1 * | 4/2009 | Gehman et al. ............... | 600/516 |
| 2009/0198387 A1 * | 8/2009 | Lin et al. ........................ | 700/300 |
| 2009/0222654 A1 * | 9/2009 | Hum et al. ..................... | 713/100 |
| 2009/0259865 A1 * | 10/2009 | Sheynblat et al. ............ | 713/323 |
| 2009/0276330 A1 * | 11/2009 | Kedia et al. ..................... | 705/26 |
| 2010/0023788 A1 * | 1/2010 | Scott et al. .................... | 713/320 |
| 2010/0058082 A1 * | 3/2010 | Locker et al. ................. | 713/320 |
| 2010/0191992 A1 * | 7/2010 | Shen et al. .................... | 713/320 |
| 2010/0262966 A1 * | 10/2010 | Dow et al. ..................... | 718/102 |
| 2011/0022871 A1 * | 1/2011 | Bouvier et al. ............... | 713/340 |
| 2013/0081038 A1 * | 3/2013 | Dowf et al. ................... | 718/102 |

\* cited by examiner

*Primary Examiner* — M Elamin

(74) *Attorney, Agent, or Firm* — Marks & Clerk

(57) ABSTRACT

A method and apparatus are provided which allow telecommunication equipment to adjust its power consumption. By replicating the functionality of a standard component for processing traffic on a general purpose CPU, traffic can be routed within the equipment to the general purpose CPU for processing instead of the component under certain conditions. If the maximum bandwidth supported by the functionality on the general purpose CPU is less than the maximum bandwidth supported by the component, then the component can be powered down during times of low traffic and the traffic routed to the general purpose CPU instead. Since the maximum bandwidth supported by the functionality on the general purpose CPU is less than the maximum bandwidth supported by the component, less power is necessary to operate the telecommunication equipment and hence cost is reduced.

14 Claims, 4 Drawing Sheets

POWER SAVING HARDWARE

FIELD OF THE INVENTION

This invention relates to computer hardware configurations, and more particularly to configurations of such hardware in order to vary power consumption.

BACKGROUND OF THE INVENTION

Energy and power consumption are increasingly becoming a significant business issue as energy costs and environmental impact are becoming more important in business models. Increased energy cost is reducing the profitability of telecom providers. Yet not all of the energy consumption of some telecommunication equipment is always needed. For example, a telecommunications node may provide a certain maximum bandwidth or packet processing capability, and this capability requires a given amount of memory and processing power to support the amount of maximum capacity. Yet this maximum capability and the resulting power usage is not always needed.

As the cost of electricity rises, the cost of operating telecommunication equipment becomes more important. Any additional complexity required in deciding whether to operate the equipment at full capacity may be outweighed by the energy savings realizable by reducing operating capacity. A hardware design for telecommunication equipment that consumed less power would reduce the costs of operating the equipment.

SUMMARY OF THE INVENTION

According to one aspect, the invention provides a telecommunication node having at least one component, each component containing functionality for processing traffic. The telecommunication node also has a general purpose processor replicating at least some of the functionality of the at least one component but able to support only a lower bandwidth than is able to be supported by the at least one component. The telecommunication node also has means for reducing the power level of at least one of the at least one component if a power saving level of the node is other than "none". The telecommunication node also has means for bypassing the at least one component whose power level was reduced by routing traffic through the general purpose processor instead of to the at least one component whose power level was reduced if the power saving level is other than "none".

According to another aspect, the invention provides a method of reducing power usage of a telecommunication node. A power level of at least one component in the telecommunication node is reduced when a power saving level of the node is increased. The at least component is bypassed by routing traffic in the node to a general purpose processor instead of to the at least one component. The traffic is processed at the general purpose processor in the same way that the traffic would have been processed had it been sent to the at least one component.

In one embodiment, the rate of the traffic within the node is determined. If the rate of the traffic is less than the maximum rate at which traffic can be processed by the general purpose processor, then the power saving level is increased. If the rate of the traffic is greater than the maximum rate at which traffic can be processed by the general purpose processor, then the power saving level is decreased. The rate of traffic may be determined from the rate at which traffic is currently processed by the at least one component if the power saving level is less than maximum.

The methods of the invention may be stored as processing instructions on computer-readable storage media, the instructions being executable by a computer processor.

The invention allows telecommunication equipment to adjust its power consumption. By replicating the functionality of a standard component for processing traffic on a lower energy-consuming general purpose CPU, traffic can be routed within a telecommunication node to the general purpose CPU for processing instead of to the component under certain conditions. If the maximum bandwidth or amount of packet processing supported by the functionality on the general purpose CPU is less than that supported by the component, then the component can be powered down during times of low traffic when the amount of traffic is low enough that it falls below the maximum bandwidth or packet processing capacity of the general purpose CPU. The traffic is routed to the general purpose CPU instead.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
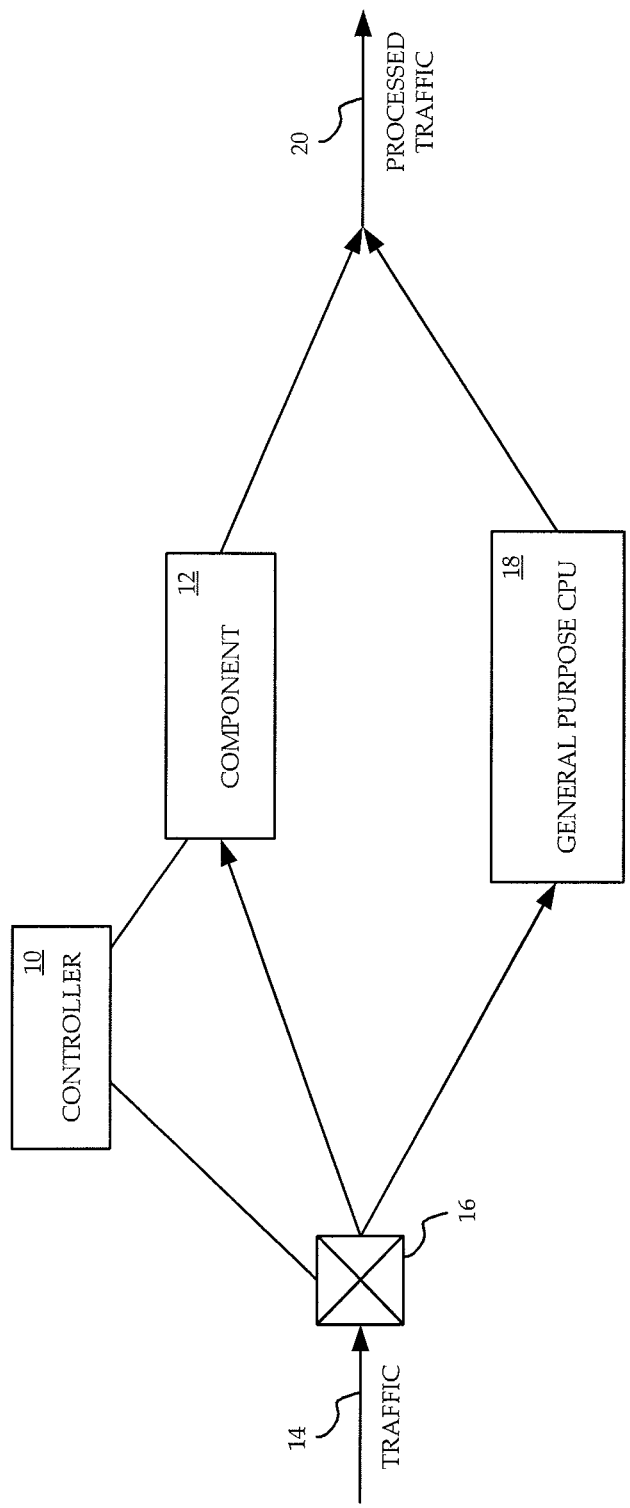
FIG. 1 is a schematic diagram of hardware components within a telecommunication node according to one embodiment of the invention.

Referring to FIG. 1, a schematic diagram of hardware components within a telecommunication node according to one embodiment of the invention is shown. A controller 10, such as a program within a computer processor, has functionality to adjust the power level of a component 12 and to affect the routing through the telecommunication node of traffic 14 entering the node. The component 12 is a standard component used for packet processing of the traffic, such as policing, traffic shaping, label manipulations, or payload manipulations. The controller 10 can set the destination of the traffic by any means, such as by altering the addressing within packets or by adjusting various processor switches within the telecommunication node, and the setting of the destination of traffic is represented schematically in FIG. 1 by switch 16.

The telecommunication node is also provided with a general purpose CPU 18. The general purpose CPU 18 contains at least a replication of the functionality of the component 12 but at a lower capacity, although the general purpose CPU 18 may also have instructions unrelated to the component 12. The resources needed to process the maximum rate of traffic supported by the general purpose CPU 18 is lower than the resources needed to process the maximum rate of traffic supported by the component 12, and the power needed to carry out this processing is reduced if the general purpose CPU 18 is used and the component 12 is powered down. As a simple example, less memory for buffering packets needs to be maintained by the general purpose CPU 18 than needs to be maintained by the component 12 since the general purpose CPU 18 supports a lower bandwidth of traffic than does the component 12, and hence less power is needed by the node.

Once processed by either the component 12 or by the general purpose CPU 18, the processed traffic 20 is eventually transmitted out of the telecommunication node.

When power saving mode is entered or exited, the controller 10 adjusts the power level of a component 12, such as by instructing the component 12 to enter a sleep mode or to exit the sleep mode. The decision to enter or exit the power saving mode may be made in any manner, but is typically based on the requirements of the telecommunication node. For example, an ingress component can measure the number of packets as they enter the node and provides the rate of entry of the packets to the controller 10. If the controller 10 determines that the limited resources of the power saving mode are sufficient to process the packets at their determined rate of entry, then the controller 10 determines that the power saving mode is to be entered. Otherwise the controller 10 determines that the power saving mode is not to be entered, or is to be exited if the node is currently in the power saving mode. As another example, the controller 10 can receive feedback from the component 12 and/or the general purpose CPU 18 to determine the current bandwidth load, and enter or exit the power saving mode based on the current bandwidth load as provided in the feedback. If the node is not in power saving mode, or if the power saving level (as described below) is less than maximum, then all traffic is being processed by the component 12 and the rate of traffic can be determined from the rate at which traffic is being processed by the component 12.

When traffic 14, usually in the form of packets, enters the node the controller 10 determines where within the node to send the traffic 14 based on whether the power saving mode has been entered. If the controller 10 determines that the node is not currently in the power saving mode, then traffic 14 entering the telecommunication node is sent to the component 12. Otherwise the component 12 is bypassed and the traffic is sent to the general purpose CPU 18.

The diagram shown in FIG. 1 is highly schematic and is intended to illustrate this embodiment of the invention at a high level. For example, the power supply to the component 12 is not shown, even though the controller 10 directly or indirectly affects the supply of power to the component 12 or the drawing of power by the component 12. The controller 10 need not be a single separate processor as suggested by FIG. 1. Rather the logic of the controller may be located on existing hardware within the telecommunication node, such as on the general purpose CPU 18. The functionality of the controller 10 could be in two separate processors or sets of instructions, one for adjusting the power level of the component 12 and one for deciding where in the telecommunication node to send the incoming traffic 14. Broadly, a general purpose CPU is provided which contains at least some functionality of a standard component of a telecommunication node but for a lower amount of traffic, and incoming traffic can be routed to either the standard component or to the general purpose CPU depending on whether the telecommunication node has entered a power saving mode.

Figure 2:
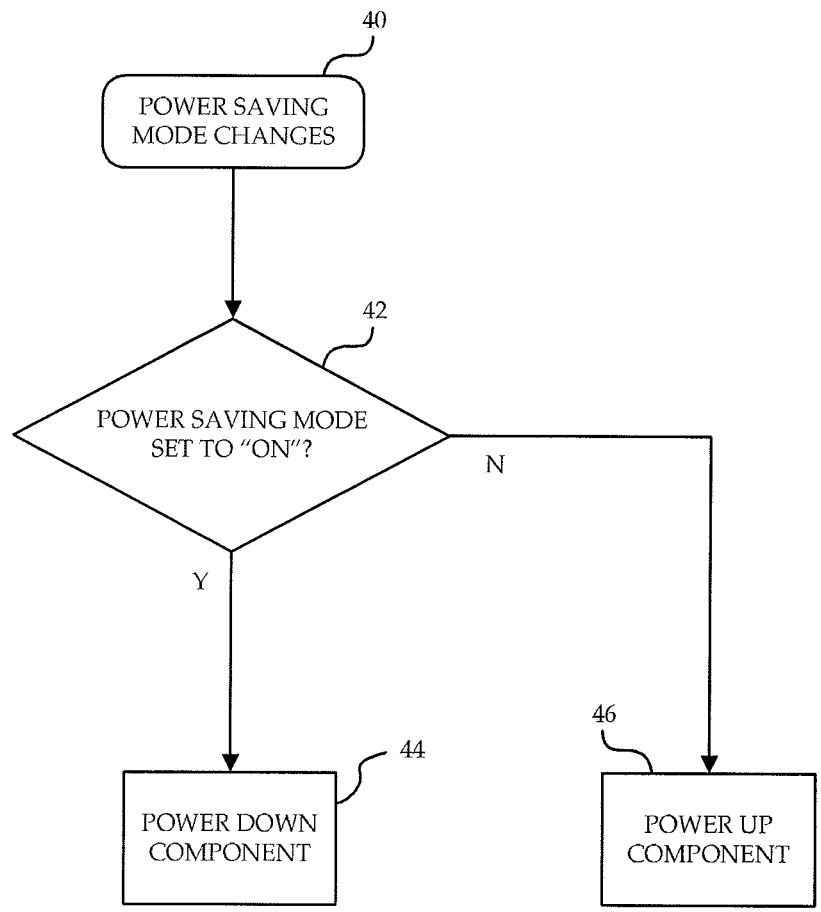
FIG. 2 is a flowchart of a method carried out by the controller of FIG. 1 according to one embodiment of the invention.

Referring to FIG. 2, a method carried out by the controller 10 according to one embodiment of the invention is shown. The method of FIG. 2 is triggered at 40 when the state of the power saving mode is changed, for example by the controller receiving an indication of the current rate at which packets need to be processed, as described above. It should be noted that the decision as to whether to enter or exit the power saving mode is not described with reference to FIG. 2. In this method, it is assumed that such a decision has already been made. At step 42 the controller 10 determines whether the power saving mode has been set to "ON". If so, then at step 44 the controller 10 powers down the component 12, for example by instructing the component 12 to enter a sleep mode. If the controller 10 determines at step 42 that the power saving mode has not been set to "ON", then at step 46 the controller 10 powers up the component 12, for example by instructing the component 12 to exit a sleep mode.

Figure 3:
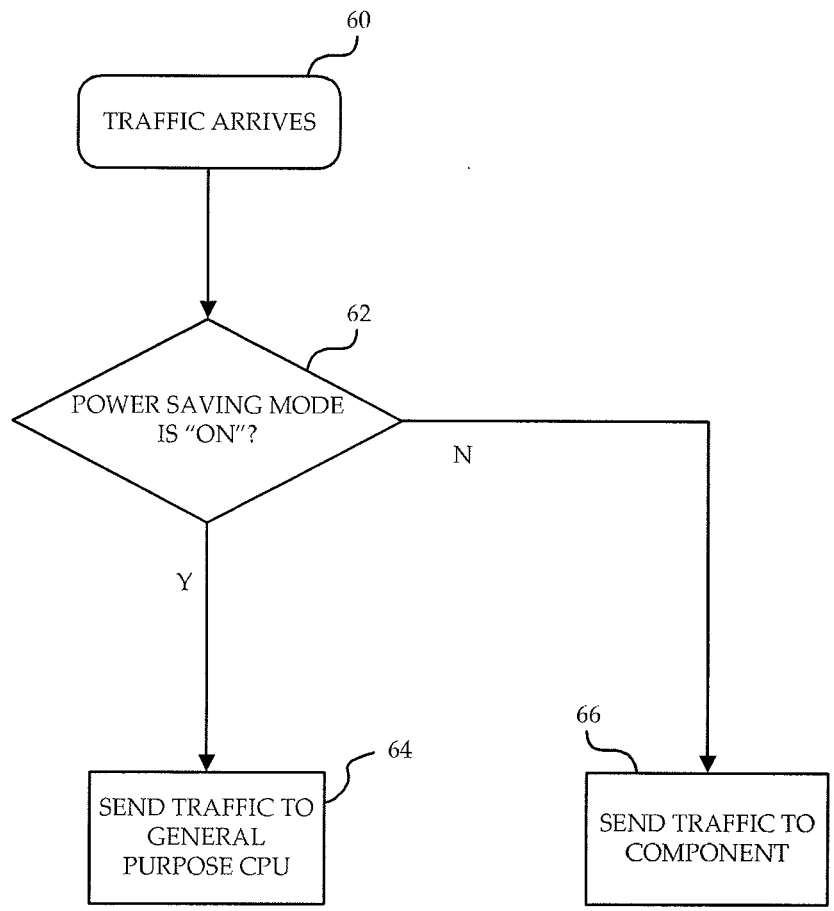
FIG. 3 is a flowchart of another method carried out by the controller of FIG. 1 according to one embodiment of the invention.

Referring to FIG. 3, another method carried out by the controller 10 according to one embodiment of the invention is shown. The method of FIG. 3 is triggered at 60 when traffic 14 enters the telecommunication node. At step 62 the controller 10 determines whether the telecommunication node is in power saving mode. If so, then at step 64 the controller 10 routes the traffic 14 to the general purpose CPU 18. If the controller 10 determines at step 62 that the telecommunication node is not in power saving mode, then at step 66 the controller 10 routes traffic to the component 12.

There may be more than one component which could process traffic at a lower bandwidth at a reduced power level. In this situation, the general purpose CPU replicates the functionality of all these components but is able only to replicate the functionality at a lower maximum bandwidth than the functionality on the components themselves. When the node enters a power saving mode, the power level of all the components is reduced, and all the components are bypassed by routing traffic within the node to the general purpose CPU for processing instead of to the components.

The invention has been described using a binary state as indicating whether a power saving mode has been entered, in response to which the controller 10 either (a) shuts down some or all power to the component 12 and routing traffic 14 to the general purpose CPU 18, or (b) powering the component 12 fully and routing traffic 14 to the component 12. Alternatively, a range of power saving levels can be used, the power saving mode case being a special case of having only two possible power saving levels.

Figure 4:
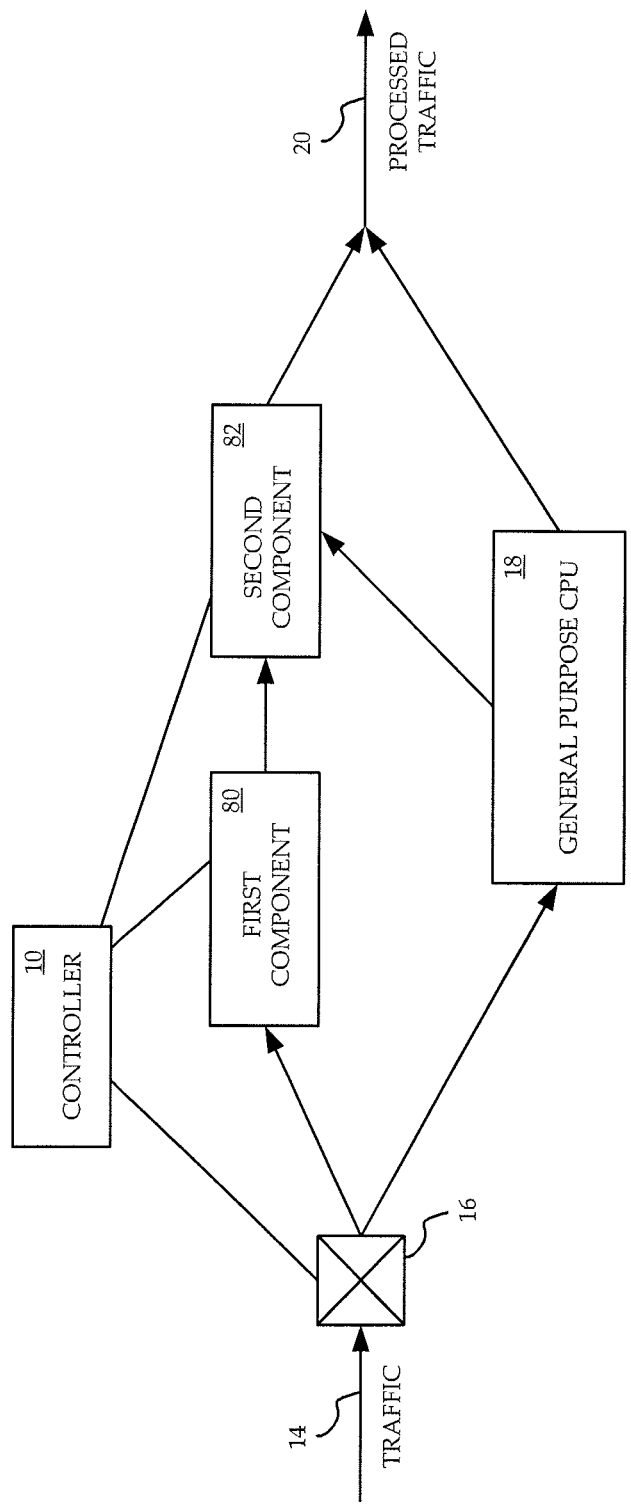
FIG. 4 is a schematic diagram of hardware components within a telecommunication node according to another embodiment of the invention.

An example of such an embodiment according to one such embodiment is shown in FIG. 4. In such an embodiment, the general purpose CPU 18 contains at least a replication of the functionality of each of two components 80 and 82, but at a lower capacity than supported by the respective components 80 and 82. The hardware configuration is then such that traffic 14 can be routed from the first component 80 to the general purpose CPU 18. The traffic 14 can take various paths through the telecommunication node depending on the level of the power saving determined by the controller 10. The controller 10 can adjust the power level of each component 80 and 82.

If the power saving level of the node is changed to zero, i.e. no power saving is to be implemented, the controller 10 adjusts the power level of both components 80 and 82 to full power, and routes all traffic 14 through each component 80 and 82.

If the power saving level of the node is changed to mid-level, the controller 10 powers down the first component 80, powers up the second component 82, and routes incoming traffic 14 to the general purpose CPU 18. The general purpose CPU 18 performs the processing normally carried out by the first component 80 then sends the partially processed packets to the second component 82 for further processing.

If the power saving level of the node is changed to full, the controller 10 adjusts the power level of both components 80 and 82 to lowest power, and routes incoming traffic 14 to the general purpose CPU 18. The general purpose CPU 18 performs the processing normally carried out by the first component 80 and performs the processing normally carried out by the second component 82. The general purpose CPU 18 then sends the processed traffic 20 towards the node exit.

Many variations are possible, such as more than two components or a hierarchy of components. Various components are bypassed when routing traffic through the node and the power level of these components is reduced, depending on the power saving level of the node. When the power saving level is "none", no components are bypassed and the power level of none of the components is reduced. As the power saving level rises, i.e. as more power saving is implemented in the node, typically more components have their power level reduced and are bypassed, although depending on the power savings effected by shutting down various components it may be more effective to shut down a high-power component than two low-power components.

The invention has been described as using a general purpose CPU which replicates some or all of the functionality of the component or components but at a lower capacity and lower energy usage. More generally, any general purpose processor can be used for this purpose, and the general purpose CPU can be replaced for example by an FPGA or an ASIC that also consumes less power than the component or components and is flexible enough to perform some of the tasks of the component or components.

The methods carried out by the controller are preferably implemented as logical instructions in the form of software. Alternatively, each or all of the logical instructions may be implemented as hardware, or as a combination of software or hardware. If in the form of software, the logical instructions may be stored on a computer-readable storage medium in a form executable by a computer processor.

The embodiments presented are exemplary only and persons skilled in the art would appreciate that variations to the embodiments described above may be made without departing from the spirit of the invention. The scope of the invention is solely defined by the appended claims.

We claim:

1. A telecommunication node comprising:
    at least one component, each component containing functionality for processing traffic;
    a general purpose processor replicating at least some of the functionality of the at least one component but able to support only a lower bandwidth than is able to be supported by the at least one component;
    means for reducing the power level of at least one of the at least one component if a power saving level of the node is other than "none"; and
    means for bypassing the at least one component whose power level was reduced by routing traffic through the general purpose processor instead of to the at least one component whose power level was reduced if the power saving level is other than "none".

2. The telecommunication node of claim 1 wherein the at least one component comprises one component, and wherein the power saving level of the node is a binary state.

3. The telecommunication node of claim 1 wherein the at least one component comprises more than one component, wherein the power saving level of the node is a binary state, and wherein the means for reducing the power level of at least one of the more than one component comprises means for reducing the power level of all of the more than one component.

4. The telecommunication node of claim 1 wherein the at least one component comprises more than one component, and wherein the power saving level has more than two states.

5. The telecommunication node of claim 1 wherein the means for reducing the power level of at least one of the at least one component comprises means for instructing the at least one component to enter a sleep mode.

6. The telecommunication node of claim 1 wherein the means for reducing the power level of at least one of the at least one component comprises means for powering down the at least one component.

7. A method of reducing power usage of a telecommunication node, comprising:
    reducing a power level of at least one component in the telecommunication node when a power saving level of the node is increased;
    bypassing the at least component by routing traffic in the node to a general purpose processor instead of to the at least one component, the general purpose processor able to support only a lower bandwidth than is able to supported by the at least one component; and
    processing the traffic at the general purpose processor in the same way that the traffic would have been processed had it been sent to the at least one component.

8. The method of claim 7 wherein the at least one component comprises one component, and wherein the power saving level of the node is a binary state.

9. The method of claim 7 wherein the at least one component comprises more than one component, and wherein the power saving level of the node is a binary state.

10. The method of claim 7 wherein reducing the power level of the at least one component comprises instructing the at least one component to enter a sleep mode.

11. The method of claim 7 wherein reducing the power level of the at least one component comprises powering down the at least one component.

12. The method of claim 7 further comprising:
    determining the rate of the traffic within the node;
    if the rate of the traffic is less than the maximum rate at which traffic can be processed by the general purpose processor, then increasing the power saving level; and
    if the rate of the traffic is greater than the maximum rate at which traffic can be processed by the general purpose processor, then decreasing the power saving level.

13. The method of claim 12 wherein determining the rate of traffic comprises measuring the rate at which traffic enters the node.

14. The method of claim 12 wherein determining the rate of traffic comprises determining the rate at which traffic is currently processed by the at least one component if the power saving level is less than maximum.

* * * * *